United States Patent
Deng

(10) Patent No.: US 9,132,457 B2
(45) Date of Patent: Sep. 15, 2015

(54) METHOD FOR HANDLING BROKEN PIECE AND BROKEN PIECE HANDLING BAG FOR USE WITH THE METHOD

(75) Inventor: HongTao Deng, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 93 days.

(21) Appl. No.: 13/508,980

(22) PCT Filed: Mar. 21, 2012

(86) PCT No.: PCT/CN2012/072675
§ 371 (c)(1),
(2), (4) Date: May 9, 2012

(87) PCT Pub. No.: WO2013/120301
PCT Pub. Date: Aug. 22, 2013

(65) Prior Publication Data
US 2013/0209001 A1    Aug. 15, 2013

(30) Foreign Application Priority Data

Feb. 15, 2012  (CN) .......................... 2012 1 0034048

(51) Int. Cl.
*B65B 1/04* (2006.01)
*B65B 67/00* (2006.01)
*B09B 3/00* (2006.01)
*B65F 1/00* (2006.01)

(52) U.S. Cl.
CPC . *B09B 3/00* (2013.01); *B65F 1/002* (2013.01); *B65F 2250/114* (2013.01)

(58) Field of Classification Search
CPC ...... B65F 1/0006; B65F 1/1415; B65D 85/42
USPC ................. 53/467, 469, 473, 476, 435, 513; 241/99, 100; 383/59, 68, 69
See application file for complete search history.

(56) References Cited

U.S. PATENT DOCUMENTS

| | | | | | |
|---|---|---|---|---|---|
| 1,673,288 | A | * | 6/1928 | Kulp et al. | 81/424.5 |
| 2,464,069 | A | * | 3/1949 | Benson | 206/466 |
| 2,731,142 | A | * | 1/1956 | Miley | 225/93 |
| 2,741,348 | A | * | 4/1956 | Zachman | 52/773 |
| 3,552,083 | A | * | 1/1971 | Willids | 53/468 |
| 4,662,535 | A | * | 5/1987 | Loveland | 220/367.1 |
| 4,771,952 | A | * | 9/1988 | Speier | 241/99 |
| 4,793,538 | A | * | 12/1988 | Blomberg | 225/93 |
| 4,953,701 | A | * | 9/1990 | Maddock | 206/419 |

(Continued)

FOREIGN PATENT DOCUMENTS

JP    2001-253410 A    9/2001

*Primary Examiner* — Stephen F Gerrity
*Assistant Examiner* — Eyamindae Jallow
(74) *Attorney, Agent, or Firm* — Cheng-Ju Chiang

(57) ABSTRACT

A method for handling broken piece includes (1) providing a broken piece handling bag made of Kevlar fibers and having a body that forms an opening and a fastening cable; (2) putting the bag over a portion of a broken glass piece; (3) tying up the fastening cable of the bag; (4) using a clip to clamp a portion of the bag corresponding to the opening so as to fix the bag to the broken glass piece; (5) smashing the portion of the broken glass piece that is received in the bag and allowing the smashed chips of the portion of the broken glass piece to remain in the bag; and (6) repeating steps (2) to (5) until the broken glass piece is completely smashed and received in the bag.

6 Claims, 2 Drawing Sheets

(56) References Cited

U.S. PATENT DOCUMENTS

| | | | |
|---|---|---|---|
| 5,050,999 A * | 9/1991 | Van Loon, III | 383/76 |
| 5,092,527 A * | 3/1992 | Perry et al. | 241/19 |
| 5,351,896 A * | 10/1994 | Nuttall | 241/99 |
| 5,542,535 A * | 8/1996 | Dalton | 206/419 |
| 5,551,643 A * | 9/1996 | Chapin | 241/99 |
| 5,553,708 A * | 9/1996 | Lawrence et al. | 206/419 |
| 5,575,429 A * | 11/1996 | Muller-Girard | 241/36 |
| 5,586,732 A * | 12/1996 | Yamauchi et al. | 241/168 |
| 5,660,338 A * | 8/1997 | Emmerson | 241/37.5 |
| 5,884,454 A * | 3/1999 | Steinmetz | 53/459 |
| 6,007,245 A * | 12/1999 | Looy | 383/116 |
| 6,186,662 B1 | 2/2001 | Jackson | |
| 6,206,889 B1 | 3/2001 | Bennardo | |
| 6,910,650 B1 * | 6/2005 | Siegelman | 241/168 |
| 7,410,054 B2 * | 8/2008 | Shatford et al. | 206/418 |
| 7,510,327 B2 * | 3/2009 | Williams et al. | 383/117 |
| 8,042,493 B2 * | 10/2011 | Jacobs | 119/709 |
| 2004/0188298 A1 * | 9/2004 | Shatford et al. | 206/418 |
| 2006/0285783 A1 * | 12/2006 | Burnett, Jr. | 383/210 |
| 2008/0115853 A1 * | 5/2008 | Snipes | 141/10 |
| 2010/0187136 A1 * | 7/2010 | Parks et al. | 206/204 |
| 2010/0290887 A1 * | 11/2010 | Beale | 414/802 |

\* cited by examiner

METHOD FOR HANDLING BROKEN PIECE AND BROKEN PIECE HANDLING BAG FOR USE WITH THE METHOD

BACKGROUND OF THE INVENTION

1. Field of the Invention

The present invention relates to the field of liquid crystal panel processing, and in particular to a method for handling broken pieces and a broken piece handling bag for use with the method.

2. The Related Arts

As displaying equipment, a liquid crystal display (LCD) is now widely used. With the liquid crystal panel advancing from generation to generation, the size of glass substrate gets lager and lager. A large size glass substrate of 2500*2000 is now becoming the main stream. The manufacturing process of liquid crystal display generally requires quite severe cleanliness of the work shop where the glass substrate is manufactured, usually as severe as class 1000 or class 100. It is often that abnormal situations occur in any step of pre-processing of the glass substrate, such as rinsing, adhesive application, exposure, development, etching, and film releasing, to cause breaking of the glass substrate in the processing machines. Under this condition, the broken glass substrate must be timely cleaned away to maintain normal operation of the machine and not affect the normal operation of the manufacturing line. Due to the glass substrate being large and thin, cleaning would be difficult. A conventional solution is using a glass cutter to cut the glass substrate into small pieces to be taken out. However, such a solution is inefficient and will consume a great amount of time and severely affect availability of the machines, thereby affecting the overall performance of the manufacturing line and raising the manufacturing cost.

SUMMARY OF THE INVENTION

Thus, an object of the present invention is to provide a method for handling broken pieces, which is easy to operate, has a high efficiency, and reduces manufacturing cost, and is capable of preventing glass powders and chips from spreading during a process of cleaning away a broken glass substrate to maintain the surroundings inside a work shop.

Another object of the present invention is to provide a broken piece handling bag, which has a simple structure, is easy to use, is applicable in a wide range, and has a long lifespan.

To achieve the objective, the present invention provides a method for handling broken piece, which comprises the following steps:

Step 1: providing a broken piece handling bag, wherein the broken piece handling bag comprises a body that forms an opening and a fastening cable that is arranged to correspond to the opening, the body being made of KEVLAR® fibers;

Step 2: putting the broken piece handling bag over a portion of the broken glass piece;

Step 3: tying up the fastening cable of the broken piece handling bag;

Step 4: using a clip to clamp a portion of the broken piece handling bag corresponding to the opening so as to fix the broken piece handling bag to the broken glass piece;

Step 5: smashing the portion of the broken glass piece that is received in the broken piece handling bag and allowing the smashed chips of the portion of the broken glass piece to remain in the broken piece handling bag; and Step 6: repeating Step 2 to Step 5 until the broken glass piece is completely smashed and received in the broken piece handling bag.

The body used in Step 1 is made of a combination of KEVLAR® fiber and cotton fiber.

In Step 2, the broken piece handling bag is fit over a portion of the broken glass piece by a length of 500 mm-800 mm.

In Step 2, the broken piece handling bag is fit over a portion of the broken glass piece by a length of 700 mm.

The broken piece handling bag has an opening perimeter that is 5,500 mm and the broken piece handling bag has a depth of 1,000 mm.

In Step 5, a hammer is used to smash the broken glass piece.

The portion of the broken piece handling bag that is clamped by the clip has an inside surface made of rubber materials.

A broken piece handling bag for use with the method for handling broken piece comprises a body forming an opening and a fastening cable that is arranged to correspond to the opening. The body is made of KEVLAR® fibers.

The body is made of a combination of KEVLAR® fiber and cotton fiber.

The broken piece handling bag has an opening perimeter that is 5,500 mm and the broken piece handling bag has a depth of 1,000 mm.

The efficacy of the present invention is that the method for handling broken pieces according to the present invention is operated by confining smashed chips of a broken glass piece all in a broken piece handling bag so that contamination of clean room caused by the chips of the broken glass piece can be prevented to ensure cleanliness of the work shop. The operation is easy and removing the broken glass piece can be done fast to thereby improve availability for manufacture and to correspondingly reduce manufacture cost. The present invention provides a broken piece handling bag that has a simple structure and is made of KEVLAR® fibers or a combination of KEVLAR® fibers and cotton fibers, and is thus light-weight, has excellent ductility, thermal stability, low corrodibility, and wear resistance, making the broken piece handling bag easy to use, having a wide range of application and long lifespan.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
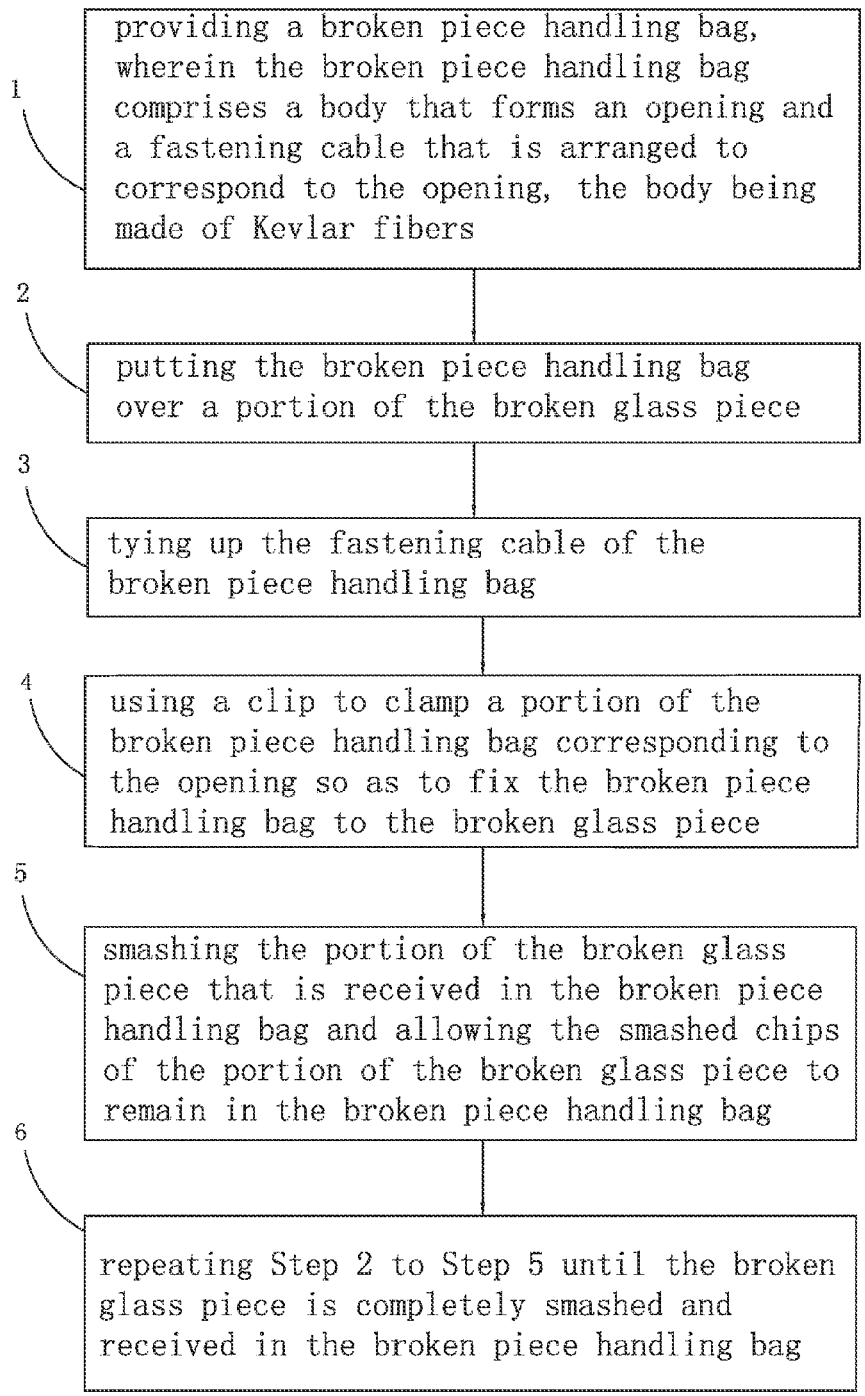
FIG. 1 is a flow chart illustrating a method for handling broken pieces according to the present invention.
Figure 2:
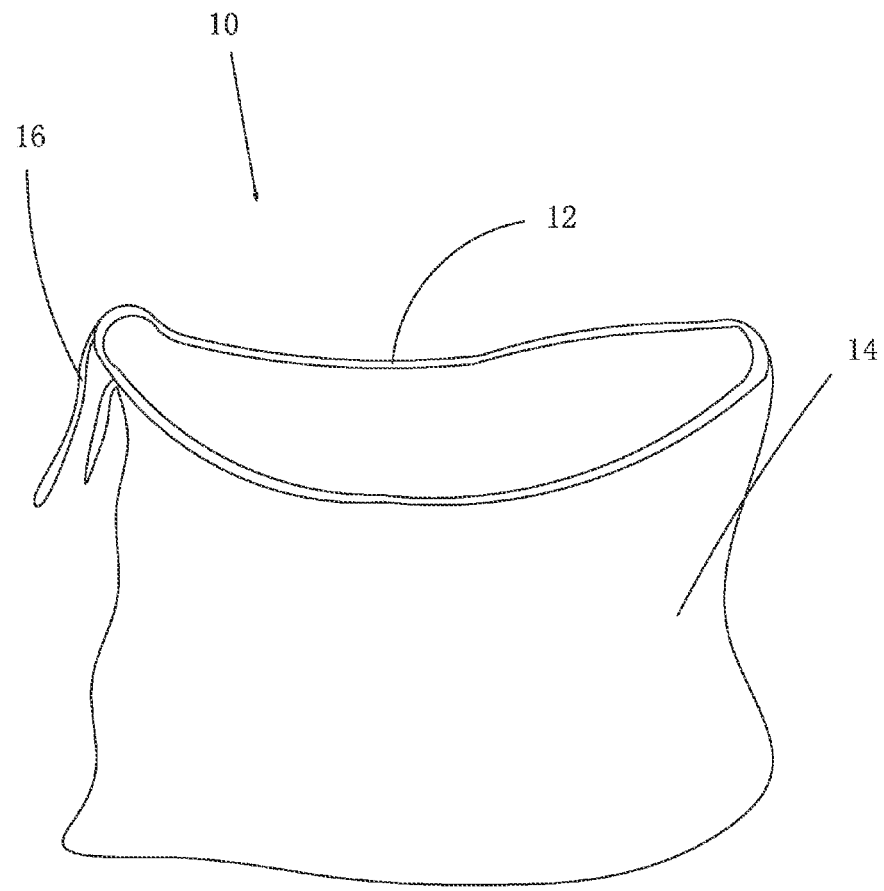
FIG. 2 is a perspective view showing a broken piece handling bag according to the present invention.

With reference to FIGS. 1 and 2, the present invention provides a method for handling broken pieces, which comprises the following steps:

Step 1: providing a broken piece handling bag 10, wherein the broken piece handling bag 10 comprises a body 14 that forms an opening 12 and a fastening cable 16 that is arranged to correspond to the opening 12, the body 14 being made of KEVLAR® fibers.

The broken piece handling bag 10 has an opening perimeter that is 5500 mm long and the broken piece handling bag 10 has a depth of 1,000 mm. KEVLAR® fiber is a para-aramid fiber and a liquid crystal bar-like molecule, which has excellent thermal stability, fire resistance, chemical resistance, insulativity, and high strength and modulus and has a strength that is five times as strong as steel fiber under the same weight. KEVLAR® fiber has an extremely low density, which is almost half of asbestos density but has excellent ductility. Further, KEVLAR® fiber also has excellent thermal stability, low corrodibility, and wear resistance. Since KEVLAR® fiber has these advantages, the broken piece handling bag 10 made of KEVLAR® fiber cannot be ripped or cut by the broken glass piece and is light-weight and easy to handle. Since KEVLAR® fiber is relatively expensive, to reduce the cost, the body can be made of a combination of KEVLAR® fibers and cotton fibers or a combination of KEVLAR® fibers and other fibers of low costs so that the cost can be cut down while the property of the body is not affected.

Step 2: putting the broken piece handling bag 10 over a portion of the broken glass piece (not shown).

In Step 2, the broken piece handling bag 10 is fit over the portion of the broken glass piece by a length of 500 mm-800 mm each time and preferably, the broken piece handling bag 10 is fit over the portion of the broken glass piece by a length of 700 mm each time.

Step 3: tying up the fastening cable 16 of the broken piece handling bag 10.

The fastening cable 16 tightly fastens the opening 12 after the broken glass piece is received in order to prevent chips of the broken glass piece from flying out, thereby eliminating potential risk of contamination occurring in the clean room that might cause contamination of the batch of glass.

Step 4: using a clip (not shown) to clamp a portion of the broken piece handling bag 10 corresponding to the opening 12 so as to fix the broken piece handling bag 10 to the broken glass piece.

The portion of the broken piece handling bag 10 that is clamped by the clip has an inside surface made of rubber materials so as to provide a function of skidding resistance and thus allowing the broken piece handling bag 10 to be tightly clamped.

Step 5: smashing the portion of the broken glass piece that is received in the broken piece handling bag 10 and allowing the smashed chips of the portion of the broken glass piece to remain in the broken piece handling bag 10.

In Step 5, a hammer (not shown) may be used to strike the broken glass piece. Using a hammer to strike the broken glass piece allows of fast and clean processing of the broken glass piece, which saves time and is efficient.

Step 6: repeating Step 2 to Step 5 until the whole broken glass piece is completely smashed and received in the broken piece handling bag 10.

The method for handling broken pieces is applicable to the manufacturing of high generation TFT-LCD (Thin-Film Transistor Liquid Crystal Display) or high generation glass substrate to prevent chips of the broken glass piece from contaminating the clean room during the handling of the broken glass piece and thus ensure cleanliness of the work shop.

Referring to FIG. 2, the present invention provides a broken piece handling bag 10 for use with the method for handling broken piece discussed above, comprising a body 14 forming an opening 12 and a fastening cable 16 that is arranged to correspond to the opening 12, the body 14 being made of KEVLAR® fibers. The broken piece handling bag 10 has an opening perimeter that is 5500 mm long and the broken piece handling bag 10 has a depth of 1,000 mm. KEVLAR® fiber is a liquid crystal bar-like molecule, which has excellent thermal stability, fire resistance, chemical resistance, insulativity, and high strength and modulus and has a strength that is five times as strong as steel fiber under the same weight. KEVLAR® fiber has an extremely low density, which is almost half of asbestos density but has excellent ductility. Further, KEVLAR® fiber also has excellent thermal stability, low corrodibility, and wear resistance. Since KEVLAR® fiber has these advantages, the broken piece handling bag 10 made of KEVLAR® fiber cannot be ripped or cut by the broken glass piece and is light-weight and easy to handle. Since KEVLAR® fiber is relatively expensive, to reduce the cost, the body can be made of a combination of KEVLAR® fibers and cotton fibers or a combination of KEVLAR® fibers and other fibers of low costs so that the cost can be cut down while the property of the body is not affected.

In summary, the method for handling broken pieces according to the present invention is operated by confining smashed chips of a broken glass piece all in a broken piece handling bag so that contamination of clean room caused by the chips of the broken glass piece can be prevented to ensure cleanliness of the work shop. The operation is easy and removing the broken glass piece can be done fast to thereby improve availability for manufacture and correspondingly reduce manufacture cost. The present invention provides a broken piece handling bag that has a simple structure and is made of KEVLAR® fibers or a combination of KEVLAR® fibers and cotton fibers, and is thus light-weight, has excellent ductility, thermal stability, low corrodibility, and wear resistance, making the broken piece handling bag easy to use, having a wide range of application and long lifespan.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for handling a glass substrate, comprising the following steps:

Step 1: providing a bag, which comprises a body that forms an opening and a fastening cable that is arranged to correspond to the opening, the body being made of fibers that have a high strength and wear resistance, wherein the glass substrate has a length and the bag has a depth that is less than the length of the glass substrate;

Step 2: putting the opening of the bag over an end of a glass substrate in such a way that a first portion of the glass substrate is received in the bag, while a remaining, second portion of the glass substrate is not received in and thus located outside of the bag;

Step 3: tying up the fastening cable of the bag around the glass substrate;

Step 4: using a clip to clamp a portion of the bag corresponding to the opening so as to fix the bag to the glass substrate in such a way that the first portion of the glass substrate is enclosed by the bag and the second portion of the glass substrate is located outside the bag;

Step 5: smashing the first portion of the glass substrate that is enclosed in the bag into small chips and allowing the smashed chips of the first portion of the glass substrate to remain in the bag with the opening of the bag being tied up by the fastening cable, wherein the second portion that is located outside the bag remains in the form of a glass substrate;

Step 6: repeating Step 2 to Step 5 to partly receive and smash the glass substrate of the remaining, second portion of the glass substrate until the entirety of the glass substrate is completely smashed and kept in the bag; and wherein the portion of the bag that is clamped by the clip has an inside surface made of rubber materials.

2. The method for handling the glass substrate as claimed in claim 1, wherein the body used in Step 1 is made of a combination of the fiber having a high strength and wear resistance and cotton fiber.

3. The method for handling the glass substrate as claimed in claim 1, wherein in Step 2, the opening of the bag is fit over the end of the glass substrate to receive a length of 500 mm-800 mm of the glass substrate in the bag.

4. The method for handling the glass substrate as claimed in claim 3, wherein in Step 2, the opening of the bag is fit over the end of the glass substrate to receive a length of 700 mm of the glass substrate in the bag.

5. The method for handling the glass substrate as claimed in claim 1, wherein the opening of the bag has an opening perimeter that is 5,500 mm and the bag has a depth of 1,000 mm.

6. The method for handling the glass substrate as claimed in claim 1, wherein in Step 5, a hammer is used to smash the first portion of the glass substrate received in the bag.

\* \* \* \* \*